(12) United States Patent
Liao

(10) Patent No.: US 12,536,227 B2
(45) Date of Patent: Jan. 27, 2026

(54) INFORMATION PROCESSING APPARATUS, INFORMATION PROCESSING METHOD, AND PROGRAM

(71) Applicant: Sony Group Corporation, Tokyo (JP)

(72) Inventor: Weihsiang Liao, Tokyo (JP)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 18/700,920

(22) PCT Filed: Oct. 11, 2022

(86) PCT No.: PCT/JP2022/037820
§ 371 (c)(1),
(2) Date: Apr. 12, 2024

(87) PCT Pub. No.: WO2023/068101
PCT Pub. Date: Apr. 27, 2023

(65) Prior Publication Data
US 2025/0238460 A1 Jul. 24, 2025

(30) Foreign Application Priority Data
Oct. 20, 2021 (JP) .................................. 2021-171660

(51) Int. Cl.
*G06F 16/632* (2019.01)
*G06F 16/638* (2019.01)
*G06T 11/20* (2006.01)
*G10L 19/00* (2013.01)

(52) U.S. Cl.
CPC .......... *G06F 16/634* (2019.01); *G06F 16/638* (2019.01); *G06T 11/206* (2013.01); *G10L 19/00* (2013.01); *G06T 2200/24* (2013.01)

(58) Field of Classification Search
CPC .... G06F 16/634; G06F 16/638; G06T 11/206; G06T 2200/24; G10L 19/00
See application file for complete search history.

(56) References Cited

U.S. PATENT DOCUMENTS

| | | | |
|---|---|---|---|
| 4,554,855 A | 11/1985 | Alonso et al. | |
| 6,990,453 B2 | 1/2006 | Wang et al. | |
| 8,170,702 B2* | 5/2012 | Kemp | G10H 1/0008 700/94 |
| 11,366,851 B2* | 6/2022 | Marchini | G06F 16/685 |
| 2008/0249982 A1 | 10/2008 | Lakowske | |

(Continued)

FOREIGN PATENT DOCUMENTS

| | | |
|---|---|---|
| JP | WO2005034086 A1 | 10/2007 |
| WO | 2005/034086 A1 | 4/2005 |

(Continued)

OTHER PUBLICATIONS

Philipsen et al., "Distance in Latent Space as Novelty Measure", Mar. 31, 2020, arXiv:2003.14043v1, pp. 1-3 (Year: 2020).*

(Continued)

*Primary Examiner* — Jared M Bibbee
(74) *Attorney, Agent, or Firm* — XSENSUS LLP

(57) ABSTRACT

An information processing apparatus according to an embodiment includes a search unit that evaluates similarity between two pieces of audio data on the basis of the distance in a latent space between latent codes obtained from the two pieces of audio data.

20 Claims, 8 Drawing Sheets

(56) References Cited

U.S. PATENT DOCUMENTS

| | | | |
|---|---|---|---|
| 2014/0270251 A1* | 9/2014 | Neufeld | H04B 15/00 |
| | | | 381/94.5 |
| 2021/0090590 A1* | 3/2021 | Vicente | G10L 25/30 |
| 2021/0256993 A1* | 8/2021 | Nachmani | G06N 20/20 |
| 2022/0036915 A1* | 2/2022 | Koretzky | G10L 25/54 |

FOREIGN PATENT DOCUMENTS

| | | |
|---|---|---|
| WO | 2020/068624 A1 | 4/2020 |
| WO | WO-2022026529 A1 | 2/2022 |

OTHER PUBLICATIONS

Shiva Sundaram et al., "Audio Retrieval by Latent Perceptual Indexing", IEEE, pp. 49-52 (Year: 2008).*

Tits et al., "Visualization and Interpretation of Latent Spaces for Controlling Expressive Speech Synthesis through Audio Analysis", Mar. 27, 2019, arXiv:1903.11570v1, pp. 1-5 (Year: 2019).*

Roberts et al., "Learning Latent Representations of Music to Generate Interactive Musical Palettes", Mar. 11, 2018, pp. 1-6 (Year: 2018).*

International Search Report and Written Opinion mailed on Nov. 15, 2022, received for PCT Application PCT/JP2022/037820, filed on Oct. 11, 2022, 10 pages including English Translation.

Kamper Herman et al: "Semantic Query-by-example Speech Search Using Visual Grounding", ICASSP 2019—2019 IEEE International Conference on Acoustics, Speech and Signal Processing (ICASSP), IEEE, May 12, 2019 (May 12, 2019), pp. 7120-7124.

Zhang Qiuyu et al: "An Encrypted Speech Retrieval Method Rased on Deep Perceptual Hashing and CNN-BILSTM", IEEE Access, IEEE, Aug. 11, 2020 (Aug. 11, 2020), pp. 148556-148568, G10L vol. 8, USA.

Zhu Hongyuan et al: "MusicBERT A Self-supervised Learning of Music Representation", Proceedings of the 45th International ACM SIGIR Conference on Research and Development in Information Retrieval, ACMPUBZ7, Oct. 17, 2021, pp. 3955-3963, New York, NY, USA.

* cited by examiner

```
DIST,FILE
2.9098458,C:¥SRCHSYS¥wav¥Snare2.wav
2.9398148,C:¥SRCHSYS¥wav¥Snare_Cymbal.wav
3.052475,C:¥SRCHSYS¥wav¥Snare_Bongo.wav
3.2654176,C:¥SRCHSYS¥wav¥Snare.wav
3.3566177,C:¥SRCHSYS¥wav¥Rim Shot.wav
              :
```

INFORMATION PROCESSING APPARATUS, INFORMATION PROCESSING METHOD, AND PROGRAM

CROSS-REFERENCE TO RELATED APPLICATIONS

The present application is based on PCT filing PCT/JP2022/037820, filed Oct. 11, 2022, which claims priority from Japanese Patent Application No. 2021-171660, filed Oct. 20, 2021, the entire contents of each are incorporated herein by reference.

FIELD

The present disclosure relates to an information processing apparatus, an information processing method, and a program.

BACKGROUND

These days, with diversification and complication of creative activities using sound, such as composition activities and musical arrangement activities, a system has been developed in which a wide variety of sounds, such as sounds that can be generated using not only various musical instruments but also objects such as glasses and tables, and cries, chirps, etc. of animals and the like, are registered in a library and utilized for creative activities.

CITATION LIST

Patent Literature

Patent Literature 1: U.S. Pat. No. 6,990,453
Patent Literature 2: U.S. Pat. No. 4,554,855
Patent Literature 3: US 2008/0249982 A

SUMMARY

Technical Problem

However, thus far, it has been the case that, to search for a target sound sample from a sound library in which several tens of thousands or more of sound samples are registered, the user needs to listen to sound samples registered in the sound library one by one and spend very much labor and time. Further, it is impractical to listen to all sound samples one by one, and this has been a cause of listening fatigue or the like.

On the other hand, a method in which a target sound sample is searched for on the basis of metadata such as file names or annotations added to sound samples is under study; however, in this method, an annotator who is a real person needs to manually give a file name representing a feature of each sound sample or one or more annotations (hereinafter, also referred to as a predefinition set) indicating perceptual characteristics of the sound (for example, a feeling of moisture, a feeling of transparency, hardness, etc. of the sound), and hence there has been a problem that prior work for constructing a sound library takes much labor and time. In addition, since the human feeling to sound varies among individuals, there has been a problem that it is highly likely that the annotation given to each sound sample in the sound library will be inconsistent. Moreover, there has been a problem that the user cannot search for a target sound sample on the basis of a feature or a characteristic not included in the predefinition set.

Thus, the present disclosure proposes an information processing apparatus, an information processing method, and a program that make it possible to acquire a sound sample similar to a target sound sample more easily.

Solution to Problem

In order to solve the above problem, an information processing apparatus according to one embodiment of the present disclosure includes: a search unit that evaluates similarity between two pieces of audio data on the basis of a distance in a latent space between latent codes obtained from the two pieces of audio data.

DESCRIPTION OF EMBODIMENTS

Figure 1:
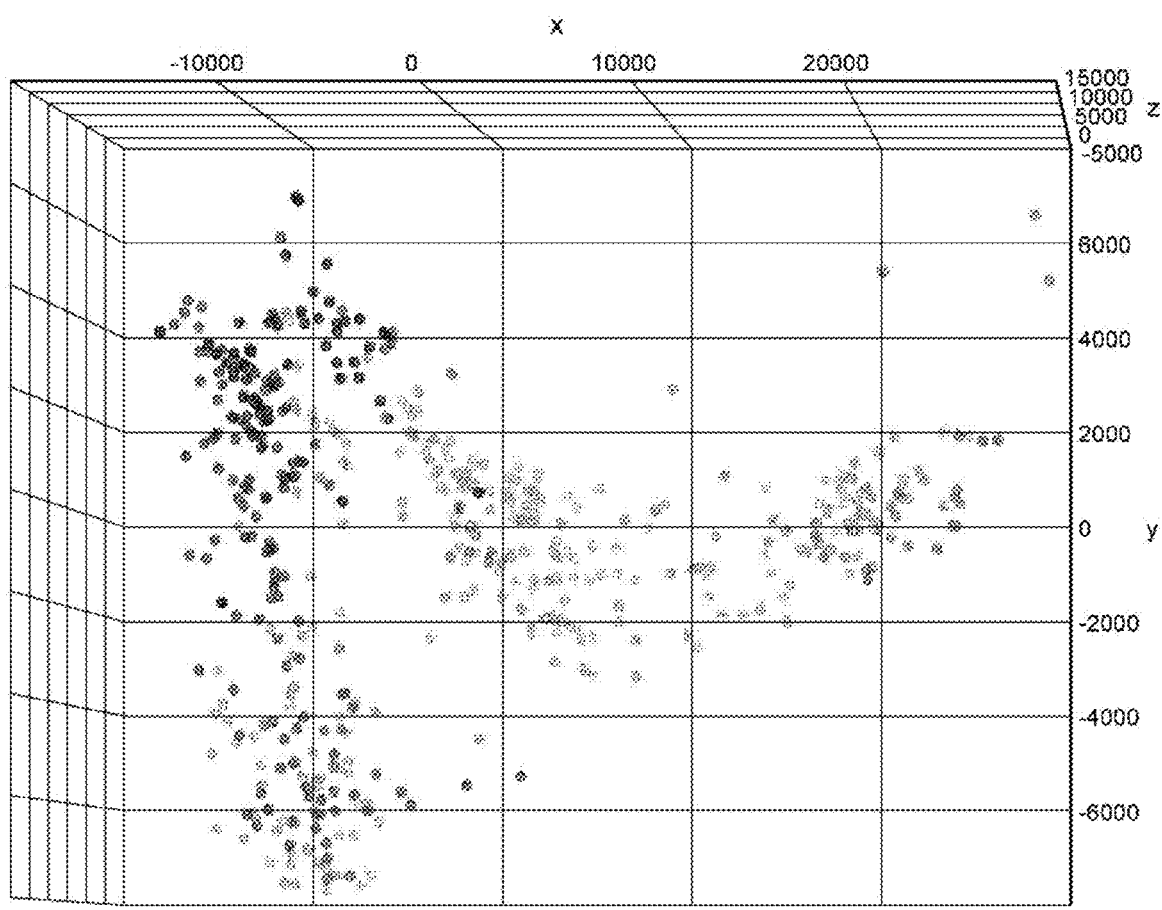
FIG. 1 is a diagram illustrating an example of a three-dimensional distribution structure of a sound library created by mapping, to a three-dimensional space, latent codes after dimension reduction to three dimensions according to an embodiment of the present disclosure.

Hereinbelow, an embodiment of the present disclosure is described in detail based on the drawings. In the following embodiment, the same parts are denoted by the same reference numerals, and a repeated description is omitted.

The present disclosure is described according to the following item order.

1. An embodiment
2. Main features of the search system according to the present embodiment 3. Main advantages of the search system according to the present embodiment
4. Schematic operation example
5. Schematic configuration example
6. User interface example
7. Hardware configuration

1. An Embodiment

An embodiment of the present disclosure will now be described in detail with reference to the drawings.

In the present description, sound data formed of an audio event of a single sound or a relatively short compound sound, such as a stroke of a drum or a one-shot sound effect, is referred to as a sound sample. The sound sample is a basic element in a musical work. Regardless of professional or amateur status, composers and sound engineers use sound samples in everyday work, such as musical arrangement, movie production, or many other operations.

However, as described above, a conventional technique for constructing a sound library in which several tens of thousands or more of sound samples are registered and a conventional technique for searching for a target sound sample from a sound library take very much labor and time. In addition, there may arise a situation where a target sound sample cannot be acquired from a sound library for reasons such as individual differences in human feeling to sound or limitations of characteristics or the like predefined as attributes.

In order to address such a problem, the present embodiment proposes a novel search scheme based on similarity of sounds themselves, that is, a sound search system based on timbre. In order to obtain a sound search system based on timbre, the present embodiment uses, for example, a deep neural network (DNN). The DNN can encode a sound sample into a short vector called a "latent code" (for example, a 512-bit-length floating-point vector).

Further, in the present embodiment, a sound sample substantially the same as the original sound sample can be restored by decoding the encoded latent code by using another DNN.

In the present embodiment, a pair of a DNN encoder and a DNN decoder can constitute an autoencoder. By using the autoencoder, as described later, a sound sample distribution diagram can be created between a data space and a latent space obtained by learning.

Further, by using several techniques in expression learning and metric learning, such as a Siamese network, the DNN can be enhanced such that, in the latent space, similar sound samples are mapped close to each other and dissimilar sound samples are mapped away from each other.

After learning is performed on the latent space, a known dimension reduction algorithm such as principal component analysis (PCA) or t-distributed stochastic neighbor embedding (tSNE) may be used, and thereby sound samples can be mapped to a low-dimensional space (for example, a two-dimensional plane or a three-dimensional space). FIG. 1 is a diagram illustrating an example of a three-dimensional distribution structure of a sound library created by mapping, to a three-dimensional space, latent codes after dimension reduction to three dimensions, and FIG. 2 is a diagram illustrating an example of a two-dimensional distribution structure of a sound library created by mapping, to a two-dimensional plane, latent codes after dimension reduction to two dimensions.

In the present embodiment, the user can acquire a target sound sample by, for example, visually searching, in a simple manner, a sound library in which sound samples are mapped to a two-dimensional plane or a three-dimensional space or inputting a sound sample of a sound similar to the target sound to the search system as a query.

Figures 2, 3:
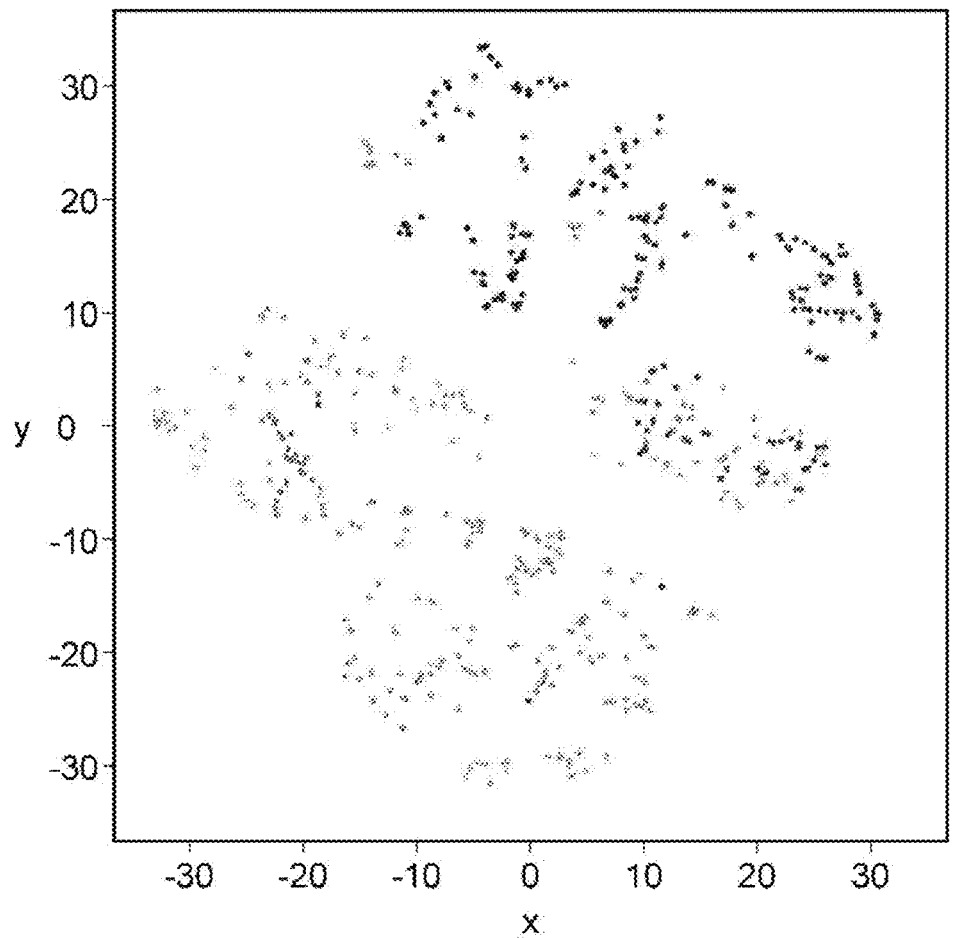
FIG. 2 is a diagram illustrating an example of a two-dimensional distribution structure of a sound library created by mapping, to a two-dimensional plane, latent codes after dimension reduction to two dimensions according to an embodiment of the present disclosure.
FIG. 3 is a diagram illustrating an example of a list of latent codes after dimension reduction according to an embodiment of the present disclosure.

As illustrated in FIG. 3, the search result may be provided to the user as a list indicating latent distances from a sound sample inputted as a query by the user to the sound samples stored in the sound library. In FIG. 3, the number on the left side in each row indicates a latent distance from a query to each sound sample, and the character string on the right side indicates a file bus to the sound sample in the sound library. Here, the latent distance may be a distance in a latent space after dimension reduction; this distance is not limited to, for example, the Euclidean distance, and various appropriate metrics may be used.

A scheme employed in the present embodiment in which similarity between sound samples is evaluated and the sound samples are mapped to a two-dimensional plane or a three-dimensional space can be used to construct a graphical sound search system that supports an audio search. The graphical search scheme based on similarity makes it possible to search for a desired sound sample by an intuitive method. Further, the graphical search scheme based on similarity does not need predefinition of features or annotations. Further, the scheme according to the present embodiment makes it possible to generate a new sound sample by interpolation from two or more sound samples, and also makes it possible to construct a comprehensive search system by combination with a conventional search system based on annotations.

The search system for implementing a scheme like the above may be incorporated in an existing search system, or may be constructed as an independent system. Further, although the system according to the present embodiment is for experts in the music industry such as composers and sound engineers, the system is not limited thereto, and it goes without saying that the system is useful also for armature users who create or edit musical pieces that are not so difficult.

2. Main Features of the Search System According to the Present Embodiment

Next, main features of the graphical sound search system according to the present embodiment are described here. The search system according to the present embodiment can have the following features. However, the search system is not limited to the following examples.

1. A graphical search not needing predefinition is possible. At this time, the graphic reflects similarity between sound samples learned by the DNN.
2. Additional input from the user is possible for improvement of search accuracy. For example, there may be a case where, although sound sample A and sound sample B are in a positional relationship indicating high similarity in the latent space, a person who actually listens feels that sound sample C is closer to sound sample A than sound sample B is; in such a case, the user can feed back to the search server the feeling that, for sound sample A, sound sample C is closer than sound sample B is. In response to this, on the search server side, the DNN is subjected to relearning with the feedback from the user taken into account, and the database (corresponding to a database 130 described later) is reconfigured. Thereby, a high-accuracy search in more agreement with the human feeling to sound can be performed.

3. A new sound sample can be generated by interpolation.
4. A configuration in which a sound sample mapped to a two-dimensional plane or a three-dimensional space can be selected with an input device such as a mouse or a touch panel and the selected sound sample can be reproduced is created. Thereby, a user interface that is easy to handle intuitively can be provided to the user.
5. The user can search a sound library for a target sound sample by inputting a sound sample to the system as a query.

3. Main Advantages of the Search System According to the Present Embodiment

By having the above features, the graphical sound search system according to the present embodiment has the following advantages as compared to conventional search systems of a sequential type, a graphical type, and a semantic type. However, the search system is not limited to the following examples.
1. Points in a point group (each point being a latent code associated with a sound sample) locally present in a two-dimensional plane or a three-dimensional space can express sounds having different characteristics from each other. This indicates that a number of characteristics equal to or more than the number of dimensions can be expressed in a two-dimensional plane or a three-dimensional space.
2. In many cases, learning can be performed without a teacher. That is, since prior labeling on the sound sample is not required, the labor and time of prior work required to construct a sound library can be greatly reduced.
3. A new sound sample can be created based on a search result. That is, even if a target sound sample is not registered in the sound library, the user can acquire a sound sample in more agreement with the target sound sample.

4. Schematic Operation Example

Figure 4:
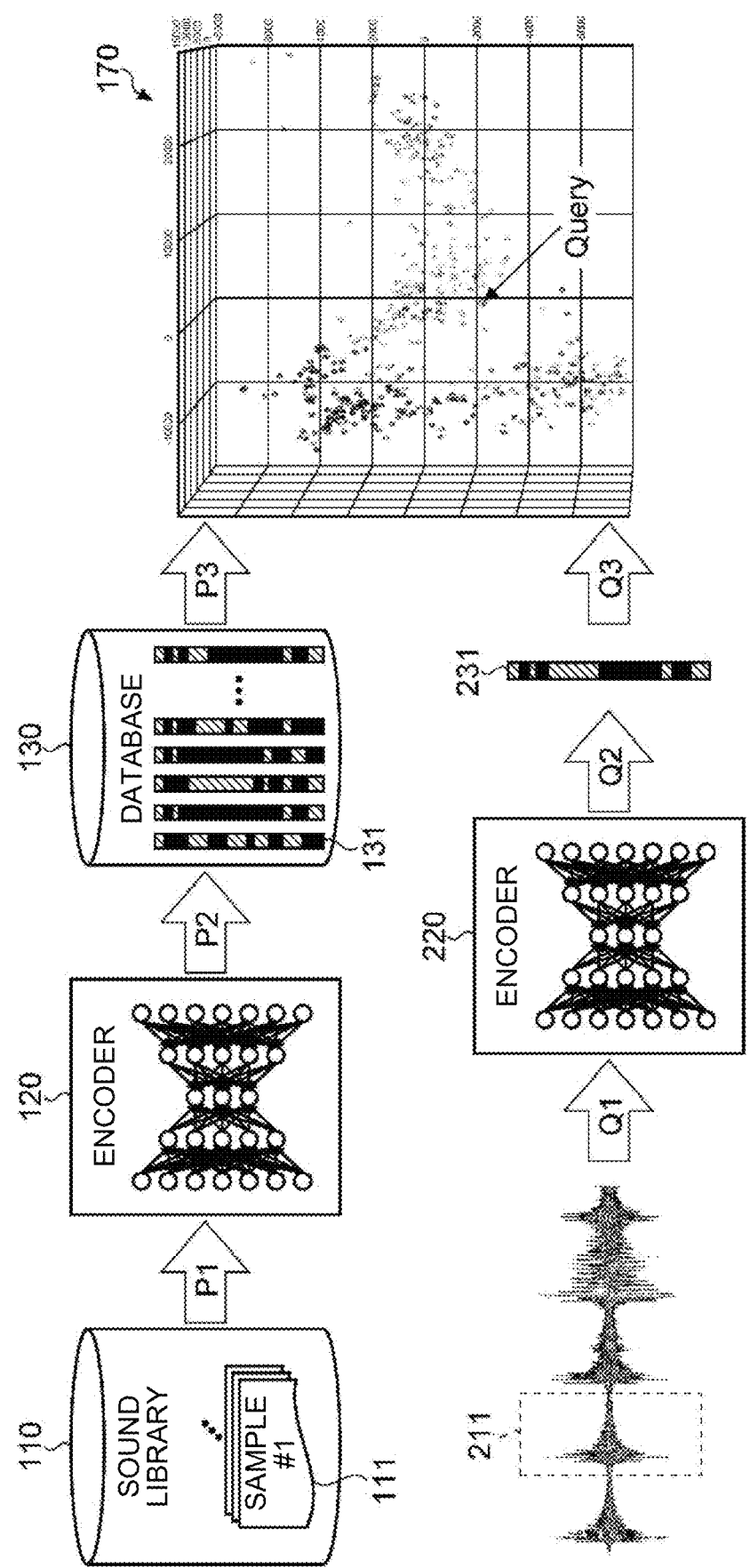
FIG. 4 is a flowchart illustrating a schematic operation example of a search system according to an embodiment.

Next, a schematic operation example of the graphical sound search system according to the present embodiment (hereinafter, also referred to as simply a search system) is described in detail with reference to the drawings. FIG. 4 is a flowchart illustrating a schematic operation example of the search system according to the present embodiment.

As illustrated in FIG. 4, a schematic operation example of the search system according to the present embodiment is composed of six steps of P1, P2, P3, Q1, Q2, and Q3. Typical use cases of the search system can be described by various combinations of these steps.

In the present operation example, first, a database 130 of latent codes 131 is constructed in order to execute a search on a sound library 110 (steps P1 and P2 of FIG. 4). Then, when the database 130 of latent codes 131 is constructed, the user searches the database 130 for a target sound sample 111 by using several methods (steps P3, and Q1 to Q3 of FIG. 4). The sound library 110 may be created on the service provider side, or may be a set of sound samples owned by the user.

4.1 Database Construction (P1 to P2)

In the construction of the database 130, one or more (for example, all) sound samples 111 registered in the sound library 110 are inputted to an encoder 120 (step P1). The inputted sound samples 111 are converted by the encoder 120 in the search system to an expression in which the distance between sound samples can be easily estimated (in the present example, latent codes 131).

The conversion of the sound sample 111 to the latent code 131 may be executed by, for example, inputting the sound sample 111 to a DNN that can perform conversion to a fixed-length vector. In this case, for example, the L2 norm can be used as a distance metric. Each vector (that is, the latent code 131) generated by conversion is associated with a link to the corresponding sound sample 111.

The thus generated vector (latent code 131) associated with a link is stored in the database 130 (step P2). Thus, a database 130 that stores latent codes 131 associated with the respective original sound samples 111 is constructed by executing the above conversion processing on one or more (for example, all) sound samples 111 registered in the sound library 110 and storing the results in the database 130.

The latent codes 131 stored in the database 130 may be subjected to dimension reduction to the number of dimensions that can be expressed in a low-dimensional projector described later (see a low-dimensional projector 150 in FIG. 7), and then mapped to a latent space that is a two-dimensional plane or a three-dimensional space.

However, in the case where latent codes 131 of low dimensions (for example, two dimensions or three dimensions) are directly outputted from the DNN, the latent codes 131 stored in the database 130 may be directly mapped to a latent space that is a two-dimensional plane or a three-dimensional space. Then, the latent space in which latent codes 131 are mapped may be used by a visualization unit described later likewise (see a visualization unit 160 in FIG. 7) to create an image (see FIGS. 1 and 2) or a list (see FIG. 3) that can be presented to the user.

4.2 Sound Sample Search (P3, and Q1 to Q3)

When the database 130 of latent codes 131 is constructed in the above manner, the user searches the database 130 for a target sound sample 111 by using several methods. Thus, in the present description, examples are given for a case where searching is performed using a query (steps Q1 to Q3 of FIG. 4) and a case where a visualized latent space is freely searched (step P3 of FIG. 4).

4.2.1 Case where Searching is Performed Using a Query (Q1 to Q3)

In the case where searching is performed using a query, the user inputs a sound sample 211 to the search system as a query (step Q1). Examples of the sound sample 211 as an input include various pieces of audio data, such as recorded sound data obtained by actually playing a musical instrument or the like, and a sound fragment cut out from audio data of a certain length or more. The user may be allowed to input a plurality of queries simultaneously.

The inputted sound sample 211 is converted to a latent code 231 by an encoder 220 in the search system. The encoder 220 may be the same encoder as the encoder 120 used to construct the database 130, or may be a different encoder. However, even in the case where the encoder 120 and the encoder 220 are different from each other, they may output the same result in response to the same input.

When the latent code 231 of the sound sample 211 inputted as a query is generated, a search unit (see a search unit 140 in FIG. 7) in the search system searches the database 130 on the basis of the latent code 231 to specify a sound sample 111 having the highest similarity to the sound sample 211. For example, the search unit 140 may acquire the distance from the latent code 231 to each latent code 131 in the database 130, and specify a latent code 131 having the shortest distance as a sound sample 111 having the highest similarity to the sound sample 211.

However, the method is not limited thereto; the latent code 231 of the sound sample 211 may be mapped in a latent space in which latent codes 131 in the database 130 are mapped, and a user interface 170 including an image of the latent space in which the latent code 231 is additionally mapped may be presented to the user.

Here, in the case where the latent space is a two-dimensional plane (see FIG. 2) or a three-dimensional space (see FIG. 1) (hereinafter, this is also referred to as two-dimensional or three-dimensional mapping), similar sound samples 111 and 211 (that is, latent codes 131 and 231) are mapped to be close to each other. Therefore, the user can acquire, as a sound sample 111 having high similarity to the sound sample 211, a sound sample 111 of a latent code 131 plotted close to the latent code 231 of the sound sample 211 inputted as a query.

On the other hand, in the case where, as illustrated in FIG. 3, the distances from the latent code 231 to the latent codes 131 are listed and presented to the user (hereinafter, this is also referred to as list mapping), a list of sound samples 111 may be sorted based on the distance from the latent code 231 to each latent code 131 and presented to the user.

The present use example is effective mainly in the following cases.
1. A case where the user wants to find, from a sound library, a sound sample that is more suitable than a sound sample actually used in composition or wants to search a sound library
2. A case where the user listens to several interesting sounds from a radio, a television, an actual event, or the like and has only low-quality recorded data (in this case, the user can use the low-quality recorded data as a query for searching for similar high-quality sound samples from a database)
3. A case where use in a specific case, such as simultaneous use of a plurality of sound samples, is restricted by a license or the like (the user can efficiently find an alternative suitable sound sample by simultaneously using a plurality of sound samples)

4.2.2 Case where a Visualized Latent Space is Freely Searched (P3)

Figure 5:
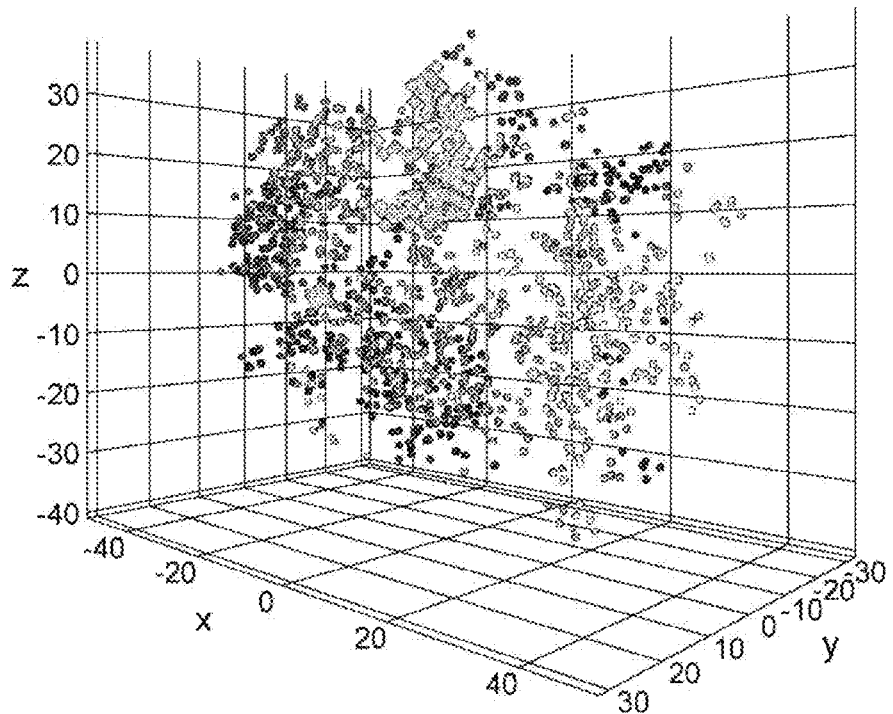
FIG. 5 is a diagram illustrating an image of a latent space (in the present example, a three-dimensional space) presented to a user in an embodiment of the present disclosure.

In the case where a visualized latent space is freely searched, the user freely searches the visualized latent space without inputting a query. FIG. 5 is a diagram illustrating an image of a latent space (in the present example, a three-dimensional space) presented to the user in the present embodiment. In FIG. 5, each point plotted in the xyz space corresponds to the latent code 131 in the database 130, that is, the sound sample 111 in the sound library 110. Further, each point in the visualized latent space functions as a graphical user interface (GUI) on which the user can perform selection by using an input device such as a mouse or a touch panel. Thus, the user can select each displayed point by using an input device or the like, and thereby perform test listening or the like of the sound sample 111 corresponding to the selected point.

The viewpoint position when visualizing the latent space by rendering or the like may be changeable by the user using an input device or the like. For example, the user may drag a point on the image in a state of clicking the point, and thereby the viewpoint position may be changed such that the latent space rotates according to the drag. Further, for example, when the user performs an operation such as rotating a wheel on a mouse, processing such as zoom-in or zoom-out on the latent space may be performed.

In addition, in the present use example, the user can more efficiently find a target sound sample 111 by labeling points in the visualized latent space with text or the like.

The present use example is useful mainly when the user does not have a specific idea in composition and wants some inspiration.

4.2.3 Generation of a New Sound Sample by Interpolation

Figure 6:
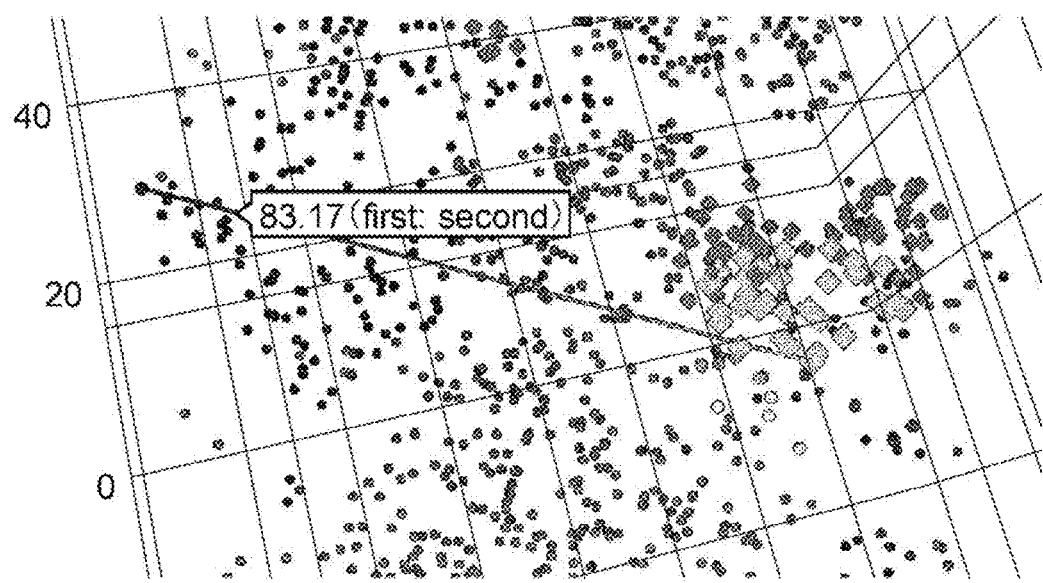
FIG. 6 is a diagram illustrating an example of a user interface presented to a user when generating a new sound sample in an embodiment of the present disclosure.

Another feature of the search system according to the present embodiment is that a new sound sample can be generated. FIG. 6 is a diagram illustrating an example of a user interface presented to the user when generating a new sound sample in the present embodiment. In FIG. 6, part of the user interface presented to the user is enlarged.

As illustrated in FIG. 6, in the present embodiment using a DNN similar to an autoencoder, an "intermediate sample" can be generated based on two or more sound samples 111. For example, a latent code (hereinafter, also referred to as an interpolation code) corresponding to the middle point on a line segment connecting, with a straight line, two latent codes 131 selected in the latent space is newly generated by interpolation, and the generated interpolation code is converted to a sound sample with a decoder in an autoencoder; thus, a new sound sample can be generated. Further, for example, an interpolation code corresponding to the center position or the centroid position of a closed plane or space formed by connecting, with straight lines, three or more latent codes 131 selected in the latent space is newly generated by interpolation, and the generated interpolation code is converted to a sound sample with a decoder in an autoencoder; thus, a new sound sample can be generated.

The position for interpolation is not limited to the middle point on a line segment or the center or the centroid of a closed plane or space, and a configuration in which the position for interpolation is automatically or manually set on the basis of the ratio of the distances from two or more selected latent codes 131 is possible.

Figure 7:
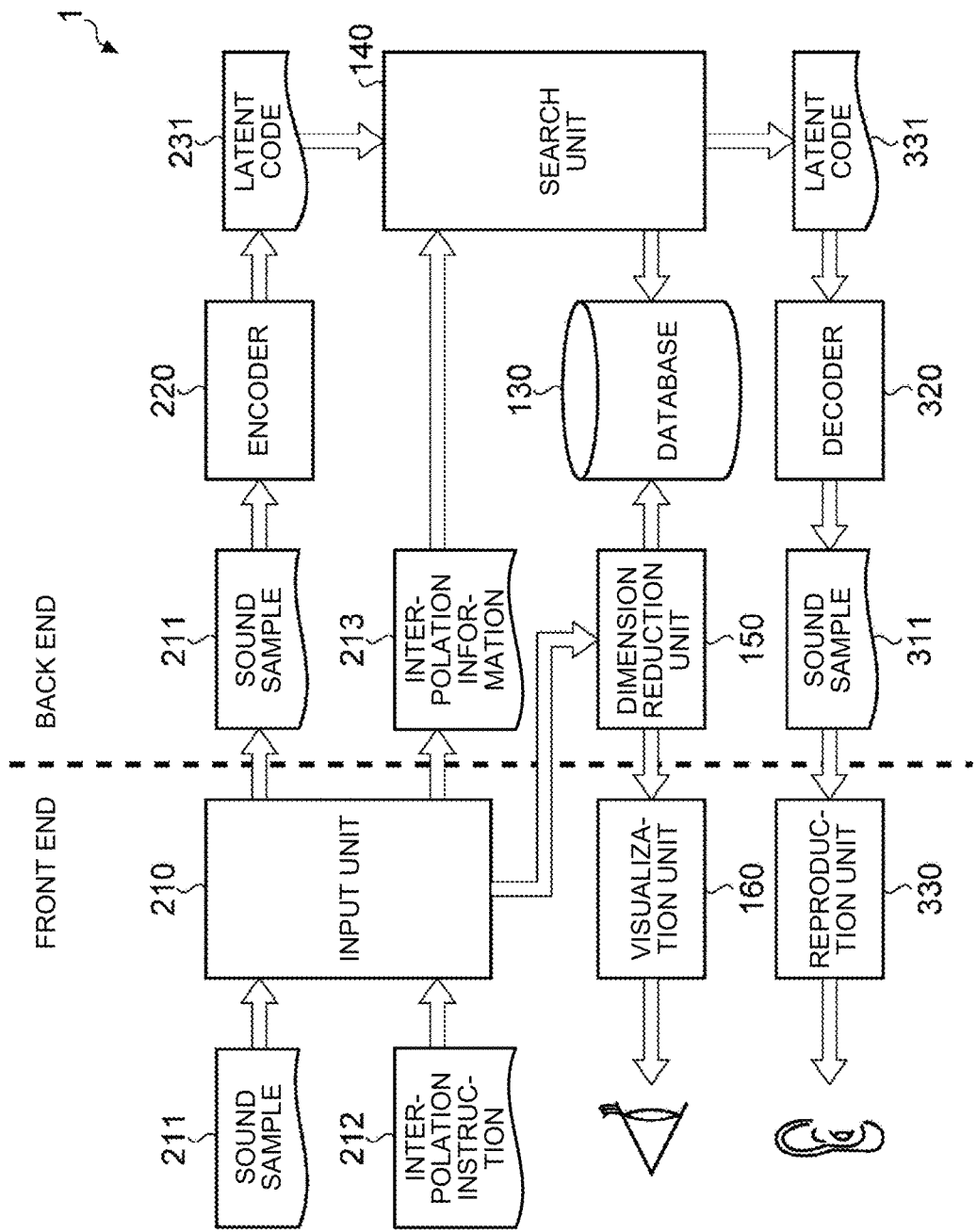
FIG. 7 is a block diagram illustrating an implementation example of a search system that can be obtained with a system architecture according to an embodiment of the present disclosure.

Such a function is useful in, for example, the following cases.
1. Case where the user wants to generate the best sound sample from several candidates in a search result
2. Case where the user wants to try an unknown sound sample 5. Schematic Configuration Example Next, a schematic configuration example of the search system according to the present embodiment is described. FIG. 7 is a block diagram illustrating an implementation example of a search system that can be obtained with a system architecture according to the present embodiment. Although FIG. 7 illustrates a configuration example of a search system constructed to provide a search service to the user, a configuration for constructing the database 130 can be easily added to the configuration illustrated in FIG. 7 on the basis of the operation example described using FIG. 4.

As illustrated in FIG. 7, a search system 1 according to the present embodiment includes an input unit 210, an encoder 220, a search unit 140, a database 130, a low-dimensional projector 150, a visualization unit 160, a decoder 320, and a reproduction unit 330. These may be components of an algorithm included in a system architecture. Although the search system illustrated in FIG. 7 has a configuration suitable for Web-based services, which is divided into, for example, a front end including the input unit 210, the visualization unit 160, and the reproduction unit 330 and a back end including the encoder 220, the search unit 140, the database 130, the low-dimensional projector 150, and the decoder 320, the configuration is not limited thereto, and the implementation form may be variously changed, for example, some or all of the components may be implemented in one or more stand-alone personal computers, one or more personal computers in an opened or closed network, or the like.

5.1 Input Unit 210

The input unit 210 is formed of, for example, an information processing terminal (hereinafter, also referred to as a user terminal) or the like connected to be able to communicate with a system of the back end via a predetermined network, such as a personal computer, a smartphone, or a tablet, and the user inputs, to the input unit 210, a sound sample 211 to be given to the search system 1 as a query. However, in the case where the search system 1 is configured as a stand-alone system or the like, the input unit 210 may be a function of a personal computer in which the search system 1 is introduced. The sound sample 211 for input may be one selected from the sound library 110, or may be one owned by the user.

The input unit 210 may provide, to the user, a function of cutting out a sound sample 211 of a single sound or a relatively short compound sound from audio data having a certain length or more. In the case where the original sound (audio data or a sound sample having a certain length or more) is composed of a plurality of sound sources (for example, in the case where the original sound is a chord), the input unit 210 may have, for example, a function of separating the original sound into sound sequences of the sound sources by a known sound source separation technique. Further, the input unit 210 may give the user a function of simultaneously inputting a plurality of sound samples 211 as a plurality of queries or one query.

5.2 Encoder 220

The encoder 220 converts the inputted sound sample 211 to a latent code 231. The conversion from the sound sample 211 to the latent code 231 may be executed by an encoder 220 in an autoencoder, but is not limited thereto, and may use various algorithms capable of mapping the sound sample 211 in a latent space that is a distance space.

Figure 8:
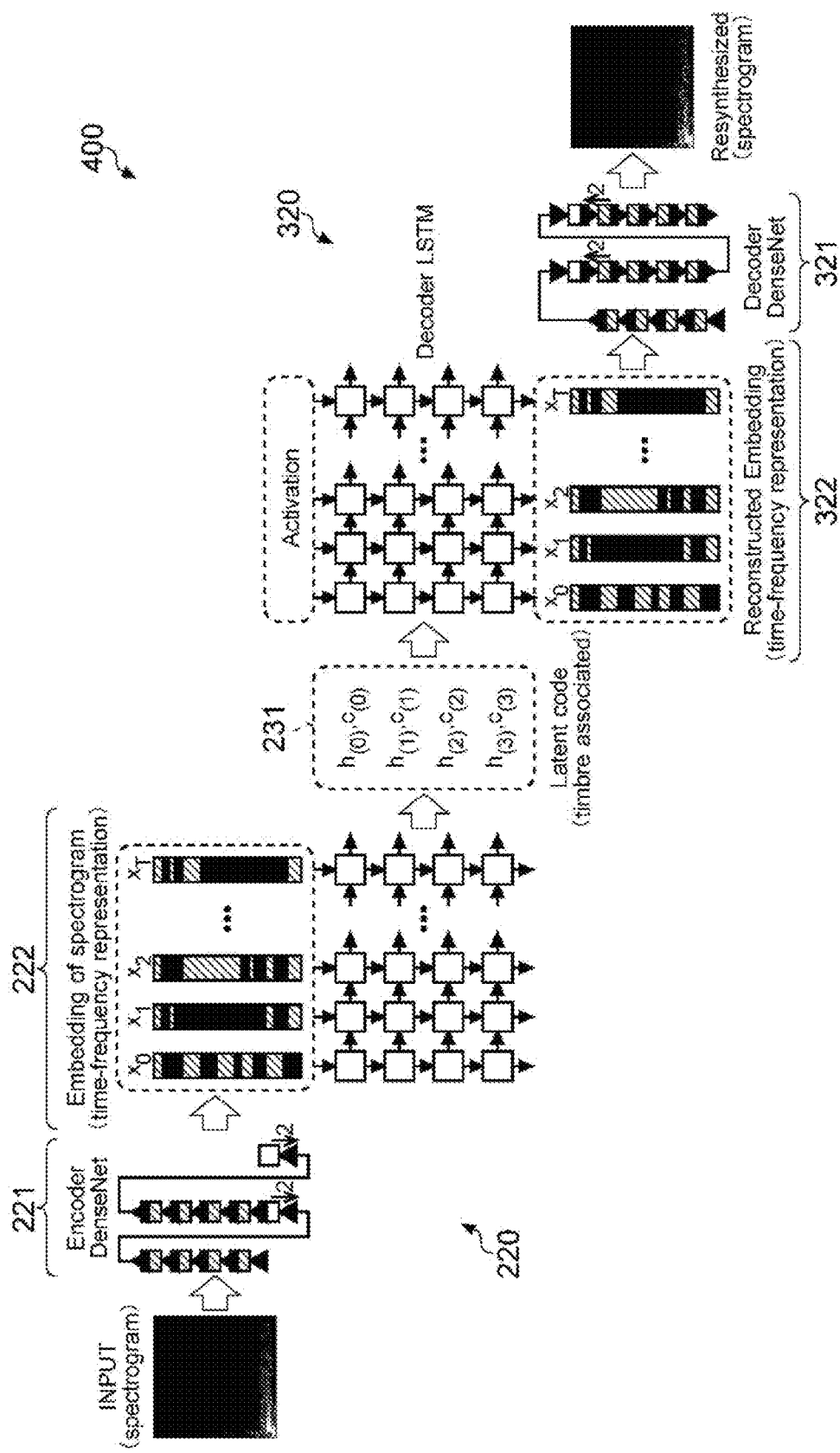
FIG. 8 is a schematic diagram illustrating an example of an autoencoder according to an embodiment of the present disclosure.

FIG. 8 is a schematic diagram illustrating an example of an autoencoder according to the present embodiment. As illustrated in FIG. 8, an autoencoder 400 is composed of an encoder 220 configured by combining a convolutional neural network (CNN) 221 and a recurrent neural network (RNN) 222, and a decoder 320 configured likewise by combining an RNN 322 and a CNN 321.

In the autoencoder 400 having such a configuration, the RNN 222 of the encoder 220 aggregates embedding of an input spectrum into a state of a certain length. Thus, sound samples of various lengths can be inputted to the autoencoder 400.

As described above, the latent space composed of latent codes and the distance between sound samples estimated in the latent space indicate, for example, perceptual similarity such as similarity in timbre, sound quality, or the like between sound samples.

As a technique for configuring such a latent space in which the distance corresponds to the perceptual similarity, there may be a technique of applying data expansion and Siamese network technology to the autoencoder 400.

The latent code created by the autoencoder 400 is compressed data of the original sound sample, and therefore includes important information that contributes to restoration in the decoder 320. The information is important also to human perception.

In addition, in the present embodiment, when constructing the database 130, a duplicated sound sample obtained by randomly changing a parameter such as the gain or the amount of delay of the original sound sample 111 is encoded using the same encoder 120. The difference between the latent code 131 of the original sound sample 111 and the latent code of the duplicated sound sample obtained by this encoding is set to the autoencoder 400 as a penalty. Thereby, the autoencoder 400 can be adjusted such that the same or substantially the same latent code is generated even when the gains or the amounts of delay are different.

By employing a configuration according to the present embodiment like the above, in evaluation of a preliminary triple test, a result of, in terms of whether a reference sound and two sound samples are similar or not, a coincidence of about 76% with a result when annotations were manually added was successfully obtained.

5.3 Database 130

The database 130 stores, for example, one or more (preferably all) latent codes 131 of the sound samples 111 stored in the sound library 110. The database 130 further holds a corresponding relationship (association) between the latent code 131 and its original sound sample 111. This can be achieved by a mapping structure based on keys and values. Here, the key may be a latent code, and the value may be a file path, a file pointer, or the like of a sound sample.

5.4 Search Unit 140

The search unit 140 evaluates similarity between two sound samples on the basis of the distance in the latent space between latent codes after dimension reduction obtained from the two sound samples. For example, on the basis of a latent code 231 obtained from a sound sample 211 inputted by the user via the input unit 210, the search unit 140 can search for a latent code 131 (hereinafter, this is referred to as a latent code 331) having high similarity to the sound sample 211 from the latent space constructed in the database 130.

Further, when an instruction (interpolation instruction) 212 to generate a new sound sample by interpolation between two or more sound samples 111 is inputted from the user via the input unit 210, the search unit 140 can, on the basis of interpolation information 213 specified from the interpolation instruction 212, generate a new latent code 331 from latent codes 131 in the database 130 corresponding to the two or more sound samples 111 selected by the user.

The interpolation information 213 can include information specifying two or more sound samples 111 selected by the user and a ratio when generating a new latent code 331 from latent codes 131 corresponding to the two or more sound samples 111.

Here, for example, when two sound samples 111 are selected, the ratio may be a ratio specified from a position set by the user on a line segment connecting two latent codes 131 in the latent space; in this case, for example, the user may use an input device such as a mouse or a touch panel to specify the position on the line segment, or may use a keyboard or the like to directly input the ratio between the distances from the latent codes 131 selected in the latent space. Alternatively, for example, when three sound samples 111 are selected, the ratio may be a ratio determined from the distances from a position on a plane or in a solid formed by connecting three or more latent codes 131 in the latent space to the latent codes 131; in this case, for example, the user may use an input device such as a mouse or a touch panel to specify the position on the plane or in the solid, or may use a keyboard or the like to directly input the ratio between the distances from the latent codes 131 selected in the latent space.

5.5 Decoder 320

The decoder 320 takes the latent code 331 as input, and outputs a sound sample 111 (hereinafter, this is referred to as a sound sample 311) associated with the latent code 331 in the sound library 110. This can be achieved by, for example, specifying the original sound sample 311 associated with the latent code 331 in the database 130.

Further, when the search unit 140 has generated a new latent code 331 on the basis of interpolation information 213, as illustrated in FIG. 8, the decoder 320 decodes the latent code 331 by using DNN-based decoding in which the RNN 322 and the CNN 321 are combined, and thereby restores (generates) a new sound sample 311 from the newly generated latent code 331.

5.6 Reproduction Unit 330

The reproduction unit 330 is composed of, for example, an audio reproduction function, a speaker, etc. in the user terminal, and reproduces, as an actual sound, the sound sample 311 generated by the decoder 320.

5.7 Low-Dimensional Projector 150

The low-dimensional projector 150 is a dimension reduction unit that performs dimension reduction on the latent code 131 in the database 130 and the latent code 231 of the sound sample 211 inputted as a query from the user from a high-dimensional space (for example, 256 dimensions or more, specifically 2048 dimensions or the like) to a low-dimensional space (for example, two or three dimensions) while maintaining the distances between adjacent latent codes 131 and 231. As described above, the dimension reduction from a high-dimensional space to a low-dimensional space can use, for example, an algorithm such as PCA or tSNE.

The low-dimensional projector 150 may accept feedback from the user as an additional condition in order to enable customization of the display system for each user. For example, the low-dimensional projector 150 may accept an instruction to switch the latent space between two dimensions and three dimensions, an instruction to switch between two-dimensional or three-dimensional mapping and list mapping, an instruction to add or exclude a sound sample 111 or a family of sound samples 111 (for example, cymbal-based sound samples, drum-based sound samples, or the like) to be mapped to the latent space, etc. Further, for example, a parameter of a dimension reduction algorithm may be switched according to feedback or setting from the user. In this case, the image of the latent space in the user interface 170 presented to the user may be an image of a latent space in which latent codes 131 and 231 subjected to dimension reduction using the dimension reduction algorithm of which the parameter has been set again are plotted.

However, as described above, in the case where a low-dimensional (for example, two-dimensional or three-dimensional) latent code 131 is directly outputted from the encoder 220, the low-dimensional projector 150 may be omitted, and the latent code 131 stored in the database 130 may be directly mapped to a latent space that is a two-dimensional plane or a three-dimensional space.

5.8 Visualization Unit 160

The visualization unit 160 receives the coordinate system of the latent space generated by the low-dimensional projector 150 and the coordinates of the latent codes 131 and 231 plotted in the coordinate system, and generates an image (hereinafter, also referred to as an image of the latent space) of a two-dimensional or three-dimensional coordinate system in which the latent code 131 is plotted as a point. Further, the visualization unit 160 generates a user interface 170 including the generated image of the latent space, and displays the user interface 170 to the user.

Here, as described above, in the user interface 170, each point in the image of the latent space has a function as a GUI. Thus, the user can select a point in the image in the user interface 170 by using an input device (a part of the input unit 210) such as a mouse or a touch panel. This selection by the user is inputted from the input unit 210 to the search unit 140. The search unit 140 specifies, from the database 130, a latent code 331 corresponding to a latent code 131 specified from the input. Then, a sound sample 311 is restored by the decoder 320 from the specified latent code 331, and is reproduced in the reproduction unit 330.

Although in the present example the visualization unit 160 is a part of the front end in a Web service or a Web application as described above, the visualization unit 160 is not limited thereto, and may be a program that operates in a stand-alone manner. Further, the visualization unit 160 may have various functions such as a function of downloading sound samples or the like and a filtering function based on file names or the like.

6. User Interface Example

Figure 9:
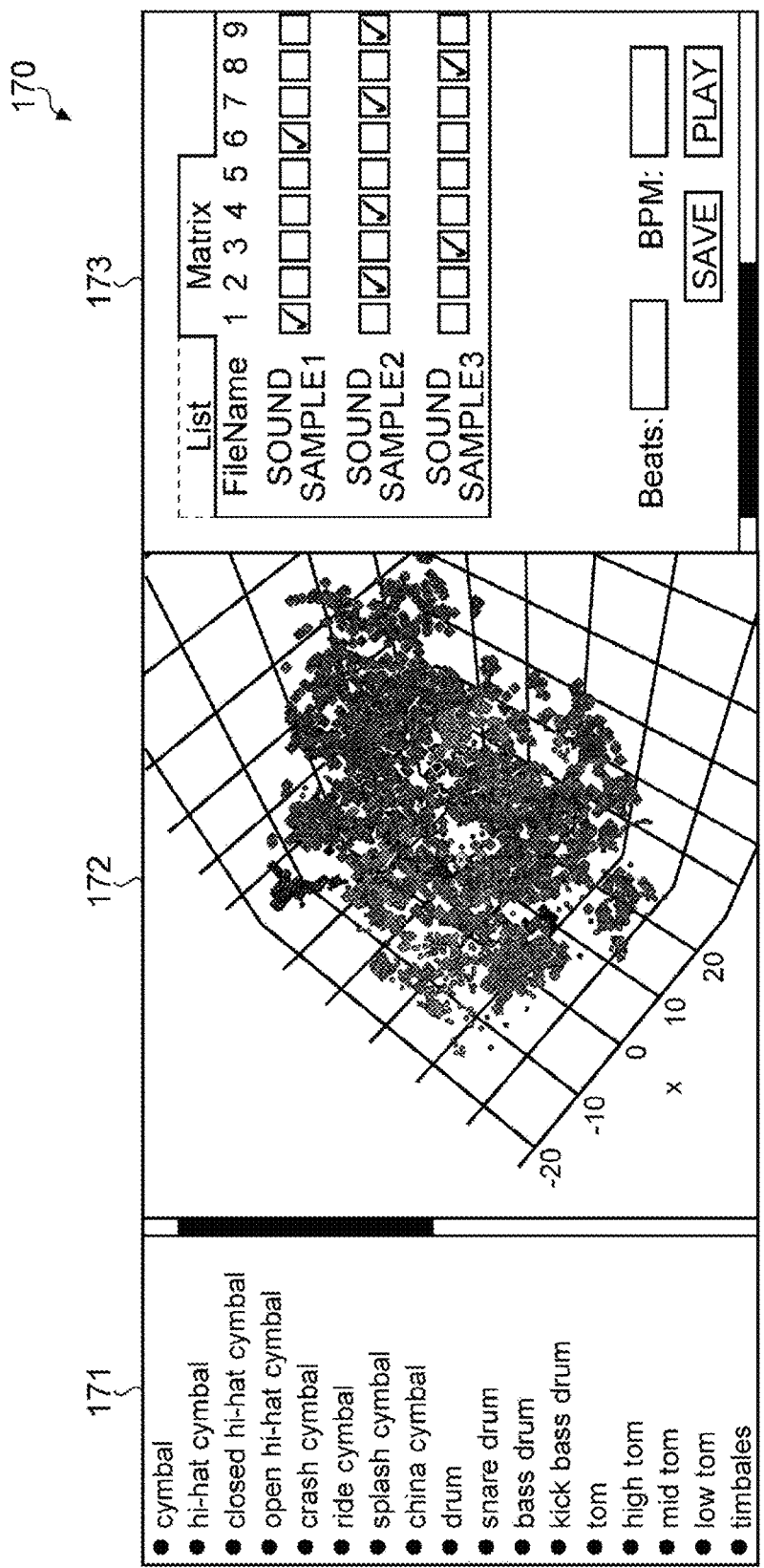
FIG. 9 is a diagram illustrating an example of a user interface according to an embodiment of the present disclosure.

Next, an example of the user interface 170 according to the present embodiment is described. FIG. 9 is a diagram illustrating an example of a user interface according to the present embodiment.

As illustrated in FIG. 9, the user interface 170 includes a sound type selection area 171 for the user to select the type of the sound sample to be plotted in the latent space, an image display area 172 for displaying an image of the latent space, and a selected list display area 173 for displaying sound samples selected by the user in the image display area 172.

(Sound Type Selection Area 171)

In the sound type selection area 171, the types (for example, cymbals, hi-hat cymbals, closed hi-hat cymbals, etc.) of sound samples 111 corresponding to latent codes 131 stored in the database 130 are displayed as a list. The type of the sound sample 111 may, for example, be specified by the low-dimensional projector 150 from file names, metadata, or the like given to the sound samples 111 corresponding to the latent codes 131 stored in the database 130. Then, the visualization unit 160 may list the types of the sound samples 111 notified from the low-dimensional projector 150, and display the list in the sound type selection area 171.

The text displaying the type of each sound sample 111 listed in the sound type selection area 171 may function as a selection button of the user interface 170. In response to this, the visualization unit 160 may plot, in the latent space, latent codes 131 of sound samples 111 corresponding to the types of one or more sound samples 111 selected by the user in the sound type selection area 171, and generate an image of the latent space.

(Image Display Area 172)

In the image display area 172, an image of a latent space in which latent codes 131 and 231 are plotted by the visualization unit 160 is displayed. At this time, as described above, each point in the image functions as a GUI for the user to select sound samples 111 and 211.

For example, in the case where the latent space is a two-dimensional plane, an image of the two-dimensional plane is displayed in the image display area 172. By the user operating an input device such as a mouse or a touch panel, the visualization unit 160 may execute image processing such as zoom-in/zoom-out, sliding, or rotation when generating an image to be displayed in the image display area 172.

On the other hand, for example, in the case where the latent space is a three-dimensional space, an image generated by rendering the three-dimensional space on the basis of a certain viewpoint position is displayed in the image display area 172. By the user operating an input device such as a mouse or a touch panel, the visualization unit 160 may execute image processing such as change in viewpoint position, zoom-in/zoom-out, sliding, or rotation when generating an image to be displayed in the image display area 172.

(Selected List Display Area 173)

In the selected list display area 173, file names of sound samples 111 corresponding to latent codes 131 selected by the user using the image display area 172 are listed and displayed.

Further, for example, check boxes for one or more bars may be displayed at each of the file names of the sound samples 111 listed in the selected list display area 173. When the user selects the "PLAY" button in a state of selecting check boxes added to file names at the user's discretion, the input unit 210 (or the visualization unit 160) may generate a sequence of latent codes 131 according to the order based on the checked positions, and input the sequence to the search unit 140. In response to this, the search unit 140 may sequentially input the latent codes 131 inputted as a sequence to the decoder 320. Thereby, a sequence of sound samples 111 corresponding to the sequence of latent codes 131 is generated. Then, the generated sequence of sound samples 111 is reproduced in the reproduction unit 330.

When the user selects the "SAVE" button in a state of selecting check boxes added to file names at the user's discretion, the input unit 210 (or the visualization unit 160) may generate a sequence of latent codes 131 according to the order based on the checked positions, and store the sequence in a not-illustrated storage area or the database 130.

7. Hardware Configuration

Figure 10:
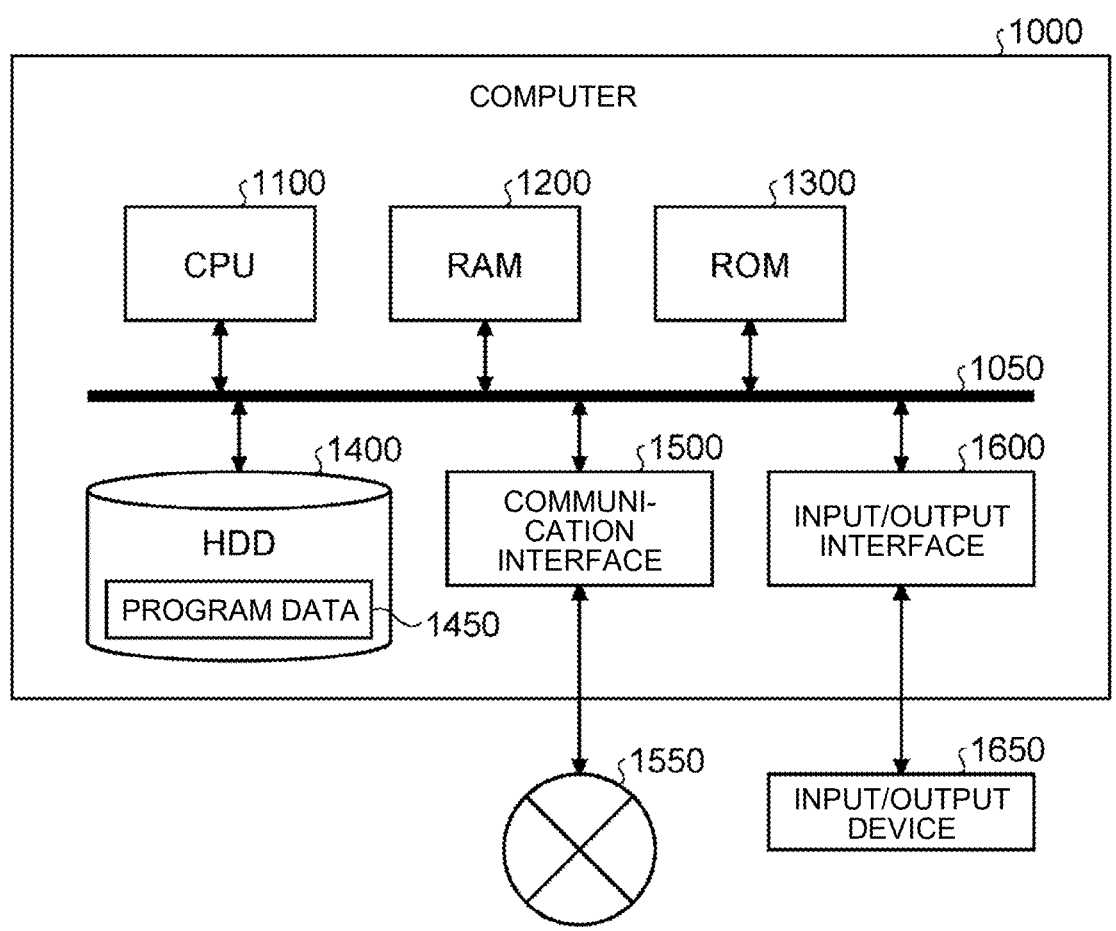
FIG. 10 is a block diagram illustrating an example of a hardware configuration of a master apparatus according to an embodiment of the present disclosure.

The search system 1 according to the embodiment described above can be implemented by, for example, one or more computers 1000 having a configuration like that illustrated in FIG. 10. FIG. 10 is a hardware configuration diagram illustrating an example of each computer 1000 that implements a functions of the search system according to the embodiment. The computer 1000 includes a CPU 1100, a RAM 1200, a read only memory (ROM) 1300, a hard disk drive (HDD) 1400, a communication interface 1500, and an input/output interface 1600. The units of the computer 1000 are connected by a bus 1050.

The CPU 1100 operates on the basis of programs stored in the ROM 1300 or the HDD 1400, and controls the units. For example, the CPU 1100 develops programs stored in the ROM 1300 or the HDD 1400 onto the RAM 1200, and executes processing corresponding to various programs.

The ROM 1300 stores a boot program such as a basic input output system (BIOS) to be executed by the CPU 1100 when the computer 1000 is activated, a program depending on hardware of the computer 1000, etc.

The HDD 1400 is a computer-readable recording medium that non-temporarily records a program to be executed by the CPU 1100, data to be used by the program, etc. Specifically, the HDD 1400 is a recording medium that records a program for executing each operation according to the present disclosure, the program being an example of program data 1450.

The communication interface 1500 is an interface for the computer 1000 to connect to an external network 1550 (for example, the Internet). For example, the CPU 1100 receives data from another device or transmits data generated by the CPU 1100 to another device via the communication interface 1500.

The input/output interface 1600 has a configuration including an I/F unit 18 described above, and is an interface for connecting an input/output device 1650 and the computer 1000. For example, the CPU 1100 receives data from an input device such as a keyboard or a mouse via the input/output interface 1600. Further, the CPU 1100 transmits data to an output device such as a display, a speaker, or a printer via the input/output interface 1600. The input/output interface 1600 may function as a media interface that reads a program, etc. recorded on a predetermined recording medium (medium). The medium is, for example, an optical recording medium such as a digital versatile disc (DVD) or a phase change rewritable disk (PD), a magneto-optical recording medium such as a magneto-optical disk (MO), a tape medium, a magnetic recording medium, a semiconductor memory, or the like.

For example, in the case where one or more computers 1000 function as the search system 1 according to the embodiment described above, the CPU 1100 of each computer 1000 achieves a function of the search system 1 by executing a program loaded on the RAM 1200. The HDD 1400 stores a program, etc. according to the present disclosure. Although the CPU 1100 reads the program data 1450 from the HDD 1400 and executes the program data 1450, these programs may be acquired from another apparatus via the external network 1550, as another example.

Hereinabove, embodiments of the present disclosure are described; however, the technical scope of the present disclosure is not limited to the embodiments described above as they are, and various modifications can be made without departing from the gist of the present disclosure. Further, components of different embodiments and modification examples may be combined as appropriate.

The effects of each embodiment described in the present specification are merely examples and are not limitative ones, and there may be other effects.

The present technology can also take the following configurations.

(1)

An information processing apparatus comprising:
a search unit that evaluates similarity between two pieces of audio data on the basis of a distance in a latent space between latent codes obtained from the two pieces of audio data.

(2)

The information processing apparatus according to (1), wherein
the distance between the latent codes in the latent space depends on similarity between the two pieces of audio data.

(3)

The information processing apparatus according to (1) or (2), further comprising:
a dimension reduction unit that performs dimension reduction on a latent code obtained by encoding audio data.

(4)
The information processing apparatus according to (3), wherein
the latent space is a two-dimensional plane or a three-dimensional space, and
the dimension reduction unit performs dimension reduction on the latent code obtained by encoding the audio data to a two-dimensional or three-dimensional latent code.

(5)
The information processing apparatus according to (3) or (4), further comprising:
an encoding unit that encodes the audio data into the latent code.

(6)
The information processing apparatus according to any one of (1) to (5), wherein
the audio data is a single sound or a relatively short compound sound.

(7)
The information processing apparatus according to any one of (1) to (6), wherein
the search unit searches for, among one or more first pieces of audio data registered in a predetermined sound library, a first piece of audio data similar to a second piece of audio data inputted from a user on the basis of a distance in the latent space between a latent code obtained from each of the one or more first pieces of audio data registered in the sound library and a latent code obtained from the second piece of audio data.

(8)
The information processing apparatus according to (7), further comprising:
a database that holds a latent code obtained by encoding each of the one or more first pieces of audio data registered in the sound library.

(9)
The information processing apparatus according to (8), wherein
each latent code in the database is associated with audio data used to generate the latent code.

(10)
The information processing apparatus according to (5), wherein
the encoding unit is configured by combining a convolutional neural network (CNN) and a recurrent neural network (RNN).

(11)
The information processing apparatus according to (5) or (10), wherein
the encoding unit is subjected to learning such that a latent code obtained from a certain piece of audio data and a latent code obtained from a duplicated piece of audio data obtained by changing at least one of a gain and an amount of delay of the certain piece of audio data are the same or substantially the same.

(12)
The information processing apparatus according to (5), (10) or (11), further comprising:
a decoding unit that restores the audio data from the latent code.

(13)
The information processing apparatus according to (12), wherein
the encoding unit and the decoding unit constitute an autoencoder.

(14)
The information processing apparatus according to (12) or (13), wherein
the decoding unit is configured by combining an RNN and a CNN, and restores, from the latent code, original audio data corresponding to the latent code.

(15)
The information processing apparatus according to any one of (1) to (14), further comprising:
a visualization unit that, for a user, visualizes the latent space in which the latent code is plotted.

(16)
The information processing apparatus according to (15), wherein
the visualization unit presents an image of the latent space to a user.

(17)
The information processing apparatus according to (16), wherein
a point corresponding to the latent code in an image of the latent space presented to the user is a graphical user interface (GUI) that allows selection by the user.

(18)
The information processing apparatus according to any one of (1) to (17), wherein
the search unit generates a new latent code by, in the latent space, interpolating two or more latent codes selected by a user.

(19)
The information processing apparatus according to (18), wherein
the search unit generates the new latent code by, in the latent space, complementing the two or more latent codes on the basis of a ratio specified by a user.

(20)
An information processing method comprising:
evaluating similarity between two pieces of audio data on the basis of a distance in a latent space between latent codes obtained from the two pieces of audio data.

(21)
A program for causing a computer to work, the program being for searching for audio data similar to audio data,
the program causing
the computer to execute:
a step of evaluating similarity between two pieces of audio data on the basis of a distance in a latent space between latent codes obtained from the two pieces of audio data.

REFERENCE SIGNS LIST

1 GRAPHICAL SOUND SEARCH SYSTEM
110 SOUND LIBRARY
111, 211, 311 SOUND SAMPLE
120, 220 ENCODER
130 DATABASE
131, 231, 331 LATENT CODE
140 SEARCH UNIT
150 LOW-DIMENSIONAL PROJECTOR
160 VISUALIZATION UNIT
170 USER INTERFACE
171 SOUND TYPE SELECTION AREA
172 IMAGE DISPLAY AREA
173 SELECTED LIST DISPLAY AREA
210 INPUT UNIT
212 INTERPOLATION INSTRUCTION
213 INTERPOLATION INFORMATION 221, 321 CNN
222, 322 RNN
330 REPRODUCTION UNIT
400 AUTOENCODER

The invention claimed is:

1. An information processing system comprising:
circuitry configured to:
encode each of a plurality of first pieces of audio data registered in a sound library and a second piece of audio data input by a user into respective latent codes;
reduce dimensions of the respective latent codes to generate respective reduced latent codes in a two-dimensional or three-dimensional latent space;
evaluate similarity between the second piece of audio data and each of the first pieces of audio data on the basis of a distance in a latent space between the reduced latent code of the second piece of audio data and the reduced latent code of the corresponding first piece of audio data; and
retrieve, from the sound library, one or more of the first pieces of audio data based on the distance.

2. The information processing system of claim 1, wherein the distance between the reduced latent codes in the latent space depends on similarity between the second piece of audio data and each of the first pieces of audio data.

3. The information processing system of claim 1, wherein:
the circuitry is configured to perform the dimension reduction on the latent codes obtained by encoding audio data.

4. The information processing system of claim 1, further comprising:
a database configured to hold, for each of the one or more first pieces of audio data registered in the sound library, a latent code obtained by encoding that first piece of audio data.

5. The information processing system of claim 4, wherein each latent code in the database is associated with corresponding audio data used to generate the latent code.

6. The information processing system of claim 1, wherein the circuitry is configured by combining a convolutional neural network (CNN) and a recurrent neural network (RNN).

7. The information processing system of claim 1, wherein the circuitry is subjected to learning such that a latent code obtained from a certain piece of audio data and a latent code obtained from a duplicated piece of audio data obtained by changing at least one of again and an amount of delay of the certain piece of audio data are the same or substantially the same.

8. The information processing system of claim 1, wherein the circuitry is configured to restore the audio data from the latent code.

9. The information processing system of claim 8, wherein the circuitry constitutes an autoencoder for performing the encoding and decoding.

10. The information processing system of claim 9, wherein
the circuitry is configured by combining an RNN and a CNN, and restores, from the latent code, original audio data corresponding to the latent code.

11. The information processing system of claim 1, wherein:
the circuitry is configured to generate a visualization of the latent space in which the latent code is plotted.

12. The information processing system of claim 11, wherein
the visualization presents an image of the latent space to a user.

13. The information processing system of claim 12, wherein
a point corresponding to the latent code in an image of the latent space presented to a user is a graphical user interface (GUI) that allows selection by the user.

14. The information processing system of claim 1, wherein
the circuitry is configured to generate a new latent code by, in the latent space, interpolating two or more latent codes selected by a user.

15. The information processing system of claim 14, wherein
the circuitry is configured to generate the new latent code by, in the latent space, complementing the two or more latent codes on the basis of a ratio specified by a user.

16. The information processing apparatus of claim 1, wherein
the circuitry is configured to perform the dimension reduction using principal component analysis (PCA) or t-distributed stochastic neighbor embedding (t-SNE).

17. The information processing apparatus of claim 1, wherein
the circuitry is configured to output a visualization of the latent space as a three-dimensional distribution structure of the reduced latent codes mapped to the sound library.

18. The information processing apparatus of claim 1, wherein
the circuitry is configured to output a visualization of the latent space as a two-dimensional plane in which points corresponding to the reduced latent codes are selectable by a user through a graphical user interface.

19. An information processing method comprising:
encoding each of a plurality of first pieces of audio data registered in a sound library and a second piece of audio data input by a user into respective latent codes;
reducing dimensions of the respective latent codes to generate respective reduced latent codes in a two-dimensional or three-dimensional latent space;
evaluating similarity between the second piece of audio data and each of the first pieces of audio data on the basis of a distance in a latent space between the reduced latent code of the second piece of audio data and the reduced latent code of the corresponding first piece of audio data; and
retrieving, from the sound library, one or more of the first pieces of audio data based on the distance.

20. A non-transitory computer-readable medium including computer program code, which when executed by circuitry, causes the circuitry to:
encode each of a plurality of first pieces of audio data registered in a sound library and a second piece of audio data input by a user into respective latent codes;
reduce dimensions of the respective latent codes to generate respective reduced latent codes in a two-dimensional or three-dimensional latent space;
evaluate similarity between the second piece of audio data and each of the first pieces of audio data on the basis of a distance in a latent space between the reduced latent code of the second piece of audio data and the reduced latent code of the corresponding first piece of audio data; and retrieve, from the sound library, one or more of the first pieces of audio data based on the distance.

\* \* \* \* \*